United States Patent
Wang et al.

(10) Patent No.: US 7,154,486 B2
(45) Date of Patent: Dec. 26, 2006

(54) STYLUS-ACCOMMODATING STRUCTURE FOR WIRELESS COMMUNICATION APPARATUS

(75) Inventors: Shih-Chieh Wang, Taipei (TW); Chien-Lung Huang, Taipei (TW); Yen-Te Chiang, Taipei (TW); James Tseng, Shulin (TW); Chu-Yang Hsu, Hsinchu (TW); Hsi-Hsing Hsu, Taoyuan (TW)

(73) Assignee: High Tech Computer Corp., Taoyuan (TW)

( * ) Notice: Subject to any disclaimer, the term of this patent is extended or adjusted under 35 U.S.C. 154(b) by 210 days.

(21) Appl. No.: 10/434,234

(22) Filed: May 9, 2003

(65) Prior Publication Data

US 2003/0214801 A1 Nov. 20, 2003

(30) Foreign Application Priority Data

May 14, 2002 (TW) .............................. 91206864 U

(51) Int. Cl.
*G09G 5/00* (2006.01)
(52) U.S. Cl. ...................................... 345/179; 345/156
(58) Field of Classification Search ................ 343/700, 343/702, 792, 860; 345/156, 157, 161, 168, 345/169, 173, 178, 179, 180; 455/82, 90, 455/404, 550, 556
See application file for complete search history.

(56) References Cited

U.S. PATENT DOCUMENTS

| 5,448,253 | A | * | 9/1995 | Ponce de Leon et al. .. 343/702 |
| 5,739,791 | A | * | 4/1998 | Barefield et al. ............ 343/702 |
| 5,926,139 | A | * | 7/1999 | Korisch ...................... 343/702 |
| 6,249,276 | B1 | * | 6/2001 | Ohno .......................... 345/173 |
| 6,262,684 | B1 | * | 7/2001 | Stewart et al. .............. 343/702 |
| 6,275,193 | B1 | * | 8/2001 | Nilsen et al. ............... 343/702 |
| 6,396,458 | B1 | * | 5/2002 | Cockson et al. ............ 343/860 |
| 6,437,745 | B1 | * | 8/2002 | Vaisanen et al. ............ 343/702 |
| 6,437,747 | B1 | * | 8/2002 | Stoiljkovic et al. ......... 343/702 |
| 6,507,763 | B1 | * | 1/2003 | Schneider et al. ............ 700/84 |
| 2002/0013160 | A1 | * | 1/2002 | Harano ........................ 455/556 |
| 2002/0024474 | A1 | * | 2/2002 | Chen .......................... 343/792 |

* cited by examiner

*Primary Examiner*—Bipin Shalwala
*Assistant Examiner*—Nitin Patel
(74) *Attorney, Agent, or Firm*—Troxell Law Office, PLLC

(57) ABSTRACT

A stylus-accommodating structure for a wireless communication apparatus includes a printed-circuit board (3), a receiving block (31) and a planar antenna (33). The receiving block further includes an outer surface (300) and a tunnel (310) for receiving a stylus (5). By providing the planar antenna (33) to be formed on the outer surface of the receiving block and further the receiving block to be built at the printed-circuit board, the wireless communication apparatus equipped with the stylus-accommodating structure can then be presented more compact.

20 Claims, 3 Drawing Sheets

STYLUS-ACCOMMODATING STRUCTURE FOR WIRELESS COMMUNICATION APPARATUS

FIELD OF THE INVENTION

The present invention relates to a stylus-accommodating structure for a wireless communication apparatus, more particularly, to a structure which has both a stylus receiver and an antenna constructed on a printed circuit board, thereby to reduce the overall volume of the wireless communication apparatus.

BACKGROUND OF THE INVENTION

In order to enable people to work with more mobility, wireless communication apparatus like cellular phones, wireless personal digital assistant (PDA) devices, wireless pocket computers and other wireless communication apparatuses have become more and more popular.

The output devices of a general wireless communication apparatus include a screen display or the other audio and image output devices. The input devices thereof include an antenna, a keyboard, a stylus, a control knob and a computer mouse etc. The convenience and functionality are the constant demands for the wireless communication apparatuses in the recent popular market. Therefore, for the input devices, the external subsidiaries such as the keyboard, the mouse and so on are gradually excluded from standardized accessories of products due to the fact that they occupy much space, and products with a touch screen display and a stylus take the place. On the other hand, the antenna component of the wireless communication apparatus is also gradually designed by a built-in manner so as to embellish the appearance of products.

Please refer to FIG. 1, which is a schematic diagram illustrating a conventional wireless communication apparatus having a touch screen display. The wireless communication apparatus 1 includes a screen display 2 exposed outside of the housing of the wireless communication apparatus 1, a printed circuit board 3 mounted in the housing thereof for constructing an electronic and circuit system, an interior antenna 4 and a stylus 5 inserted on the housing thereof. The antenna 4 of the wireless communication apparatus 1 as shown in FIG. 1 is constructed by a built-in mode, different from an exposed antenna in the prior art, and treated with a film layout or by coating in the housing.

Referring to the wireless communication apparatus 1 of FIG. 1, the built-in antenna 4 substitutes for the external antenna and the combination of the screen display 2 and the stylus 5 is used as an input device for communication. The above-mentioned two renewals (i.e., built-in antenna and stylus) have become the mainstream of the present market. However, considering the employment of the housing space in terms of product design, the improvement thereof is still available.

In the conventional wireless communication apparatus 1, the antenna 4 is usually constructed or formed in the housing, or is built on an extended portion (not shown in FIG. 1) from an interior component, and then is connected to a circuit component on the printed circuit board 3. The stylus 5 is inserted in a channel 6 formed at the edge of the housing. Generally, since the stylus 5 and the antenna 4 are two discrete components and hence, a relatively large space of the housing is required to accommodate the two components. Such a drawback in the prior art in terms of space disposition is desired to be improved in the present invention.

SUMMARY OF THE INVENTION

The primary objective of the present invention is to provide a stylus-accommodating structure for a wireless communication apparatus. By integrating the structure with a built-in antenna and a stylus, the wireless communication apparatus equipped with the stylus-accommodating structure can be presented more compact.

In one embodiment of this invention, a stylus-accommodating structure for a wireless communication apparatus is disclosed. The stylus-accommodating structure comprises a printed-circuit board, a receiving block and a planar antenna, wherein the receiving block is built on the printed circuit board and further includes an outer surface and a tunnel for receiving a stylus; and the planar antenna is formed on the outer surface of the receiving block.

In one embodiment of this invention, the receiving block can be mounted on one side of the printed-circuit board.

In another embodiment of this invention, the receiving block can be mounted beside an outer edge of the printed-circuit board.

In one embodiment of this invention, the wireless communication apparatus includes a housing in the interior of which the printed-circuit board, the receiving block and the planar antenna are contained, and an opening is formed on the housing corresponding to the tunnel of the receiving block. By means of the opening, the stylus goes through the housing and enters into the tunnel of the receiving block.

In one embodiment of the receiving block according to this invention, the tunnel can be a through hole in the receiving block.

In another embodiment of the receiving block according to this invention, the tunnel can be a blind hole having one opening at only one side thereof.

In one embodiment of the receiving block according to this invention, the tunnel has a cross section of a semicircle.

In another embodiment of the receiving block according to this invention, the tunnel has a cross section of a whole circle.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The detailed description of the present invention is given by the following best mode for illustration.

Figure 1:
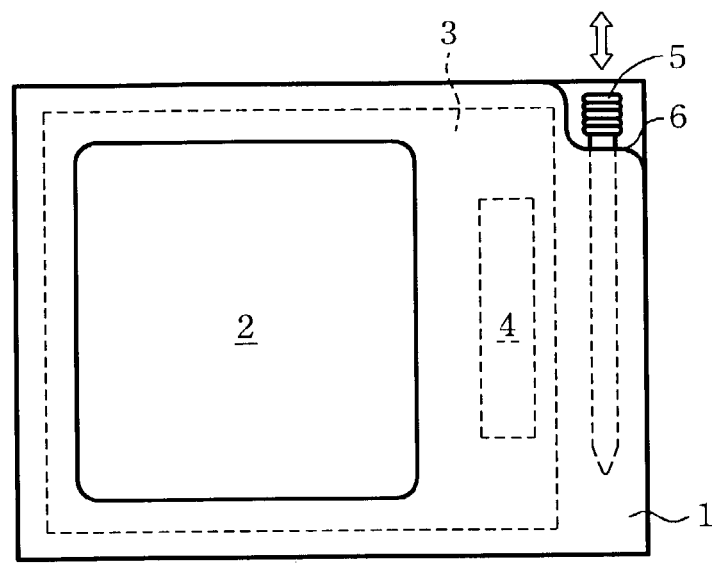
FIG. 1 is a schematic diagram illustrating a wireless communication apparatus having a touch screen display in accordance with the prior art.
Figure 2:
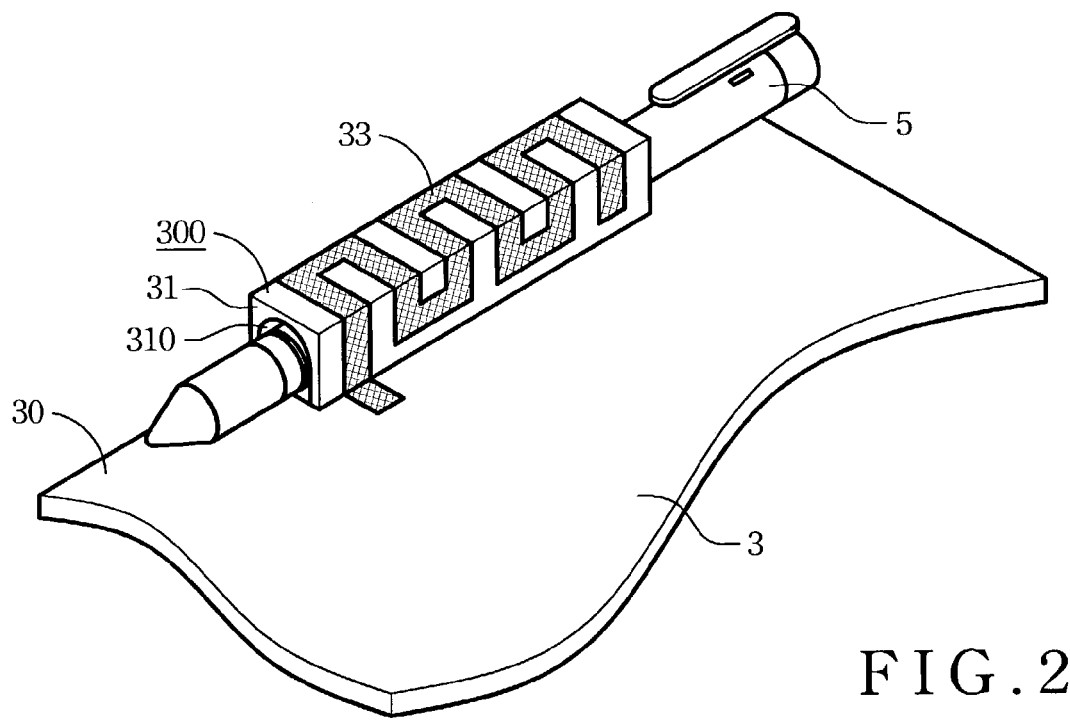
FIG. 2 is a perspective diagram illustrating one embodiment of a stylus-accommodating structure for a wireless communication apparatus in accordance with the present invention.

Please refer to FIG. 2, which is a perspective diagram of a preferred embodiment of a stylus-accommodating structure for a wireless communication apparatus in this invention. The stylus-accommodating structure includes a printed-circuit board 3, a receiving block 31 and a planar antenna 33, wherein the printed-circuit board 3 is used to be a carrying platform of the circuit component of the wireless communication apparatus; the receiving block 31 is constructed in connection with the printed circuit board 3 and further includes an outer surface 300 and a tunnel 310 for receiving a stylus 5; and the planar antenna 33 is formed on the outer surface 300 of the receiving block 31.

As shown in FIG. 2, by providing the planar antenna 33 to be formed on the outer surface 300 of the receiving block 31 in which the stylus 5 is inserted and further the receiving block 31 to be built at the printed-circuit board 3, the wireless communication apparatus equipped with the stylus-accommodating structure can then be presented more compact.

Figure 3:
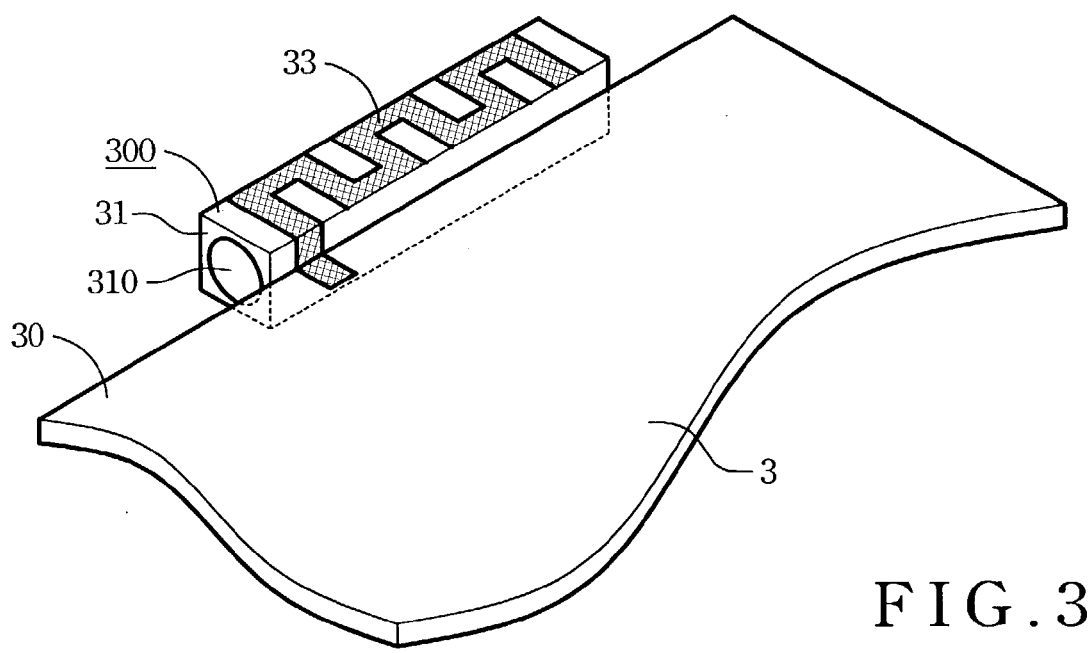
FIG. 3 is a perspective diagram illustrating another embodiment of a stylus-accommodating structure for a wireless communication apparatus in accordance with the present invention.

In the embodiment of FIG. 2, the receiving block 31 is built on one side 30 of the printed-circuit board 3, that is, the receiving block 31 is in up-and-down connection with the printed-circuit board 3. In another embodiment of FIG. 3, the receiving block 31 is built along the outer edge of the side 30 of the printed-circuit board 3, that is, the receiving block 31 is in side-by-side connection with the printed-circuit board 3. Certainly, in the other embodiments (not shown), the receiving block 31 may also be constructed on the other positions of the printed-circuit board 3. Regardless of the location of the receiving block 31, the planar antenna 33 electrically connects with the printed circuit board 3.

Figure 4:
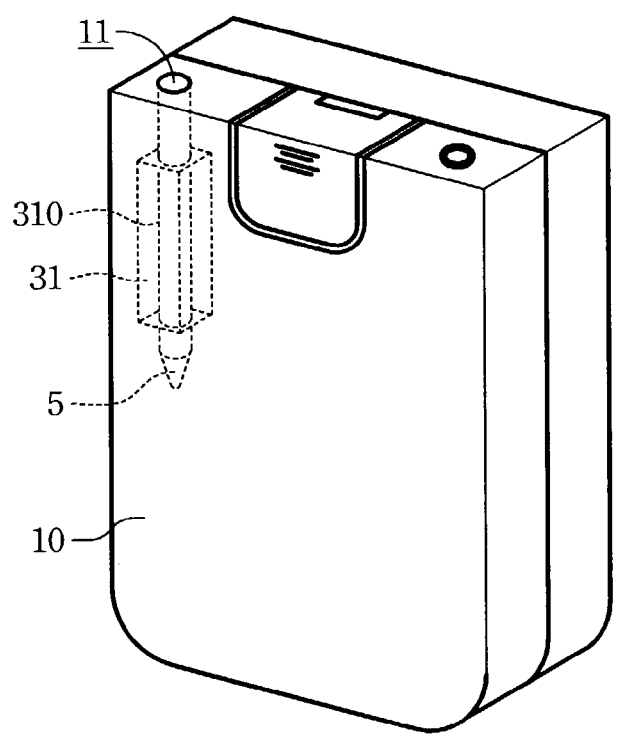
FIG. 4 is a perspective diagram illustrating an application of the stylus-accommodating structure in accordance with the present invention in a wireless communication apparatus.

Turning to FIG. 4, which is a schematic diagram illustrating construction of the stylus-accommodating structure of the present invention in the housing of a wireless communication apparatus, the printed-circuit board (not shown), the receiving block 31 and the planar antenna (not shown) are contained in the interior of a housing 10 of the wireless communication apparatus, and an opening 11 can be formed on the housing 10 corresponding to the tunnel 310 of the receiving block 31. By means of the opening 11, the stylus can go through the housing 10 and enter into the tunnel 310 of the receiving block 31.

Figure 5A:
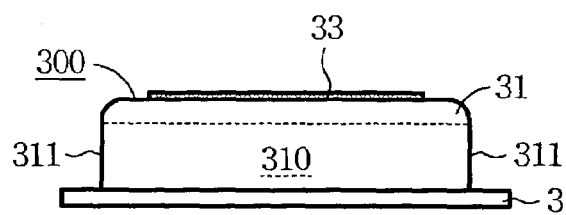
FIG. 5A is a schematic side view illustrating one embodiment of a receiving block in accordance with the present invention.
Figure 5B:
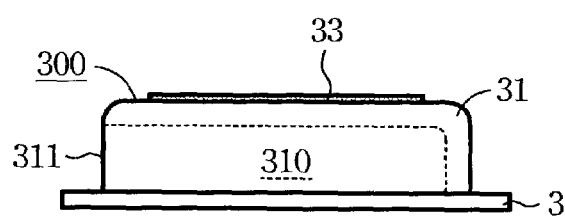
FIG. 5B is a schematic side view illustrating another embodiment of a receiving block in accordance with the present invention.

In this invention, the tunnel 310 is a tunnel-like channel formed in the receiving block 31 for accommodating the stylus 5, and the embodiments thereof are numerous. FIGS. 5A and 5B are schematic side views illustrating two embodiments of the tunnel 310 of the receiving block 31 of the present invention. As shown in FIG. 5A, the tunnel 310 is a channel penetrating through the two sides of the receiving block 31 and has one opening 311 at each side thereof; hence, the stylus 5 can penetrating through the receiving block 31. In the embodiment of FIG. 5B, the tunnel 310 is formed in the receiving block 31 as a blind channel and has one opening 311 at only one side thereof; hence, the receiving block 31 is a nest of the stylus 5.

Figure 6A:
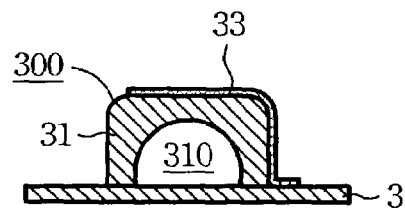
FIG. 6A is a schematic cross-sectional view illustrating one embodiment of a receiving block in accordance with the present invention.
Figure 6B:
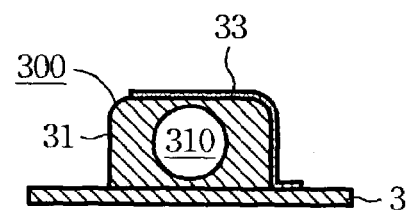
FIG. 6B is a schematic cross-sectional view illustrating another embodiment of a receiving block in accordance with the present invention.

FIGS. 6A and 6B are schematic cross-sectional views illustrating two embodiments of the receiving block 31 of the present invention. As shown in FIG. 6A, the tunnel 310 has a cross section of a semicircle. In the embodiments of FIG. 6B, the tunnel 310 of the receiving block 31 has a cross section of a circle.

In this invention, bulges, indents or other similar positioning designs may be mounted between the stylus 5 and the receiving block 31 or between the stylus 5 and the housing 10.

By integrating the antenna and the stylus receiver on the printed circuit board, the stylus-accommodating structure for a wireless communication apparatus of this invention not only can provide convenient employment of the planar antenna, but also can have the wireless communication apparatus more compact.

As is understood by a person skilled in the art, the foregoing preferred embodiment of the present invention is illustrated of the present invention rather than limiting of the present invention. It is intended to cover various modifications and similar arrangements included within the spirit and scope of the appended claims, the scope of which should be accorded the broadest interpretation so as to encompass all such modifications and variations.

What is claimed is:

1. A stylus-accommodating structure for a wireless communication apparatus, comprises:
   a printed-circuit board;
   a receiving block, which is built on said printed circuit board and includes an outer surface and a tunnel adapted for receiving a stylus; and
   a planar antenna, which is formed on said outer surface of said receiving block and electrically connects with the printed-circuit board.

2. The stylus-accommodating structure of claim 1, wherein said receiving block is mounted on one side of the printed-circuit board.

3. The stylus-accommodating structure of claim 1, wherein said receiving block is mounted beside an edge of the printed-circuit board.

4. The stylus-accommodating structure of claim 1, further comprising a housing in the interior of which said printed-circuit board, said receiving block and said planar antenna are contained, and on which an opening through which said stylus enters into said tunnel is formed, the opening corresponding to said tunnel of said receiving block.

5. The stylus-accommodating structure of claim 1, wherein said tunnel is a through hole in the receiving block.

6. The stylus-accommodating structure of claim 1, wherein said tunnel is a blind hole in the receiving block.

7. The stylus-accommodating structure of claim 1, wherein the tunnel has a cross section of a semicircle.

8. The stylus-accommodating structure of claim 1, wherein said tunnel has a cross section of a circle.

9. A wireless communication apparatus, comprising:
   a housing; and
   a stylus receiving block mounted in the housing, the block having an outer surface and defining a tunnel therein;
   a planar antenna formed on the outer surface of the block; and
   a stylus received in the tunnel of the block.

10. The wireless communication apparatus of claim 9, wherein the housing has an opening corresponding to the tunnel so that the stylus can enter the tunnel via the opening.

11. The wireless communication apparatus of claim 10, wherein the tunnel is through hole in the block.

12. The wireless communication apparatus of claim 10, wherein the tunnel is a blind hole in the block.

13. The wireless communication apparatus of claim 10, wherein the tunnel has a cross section of a semicircle.

14. The wireless communication apparatus of claim 10, wherein the tunnel has a cross section of a whole circle.

15. A wireless communication device comprising:
a housing;
a printed circuit board mounted in the housing;
a stylus receiving block mounted in the housing, having a an outer surface and a tunnel therein;
a planar antenna formed on the outer surface of the block and electrically connecting with the printed circuit board; and
a stylus received in the tunnel of the block.

16. The wireless communication apparatus of claim 15, wherein the receiving block is mounted on the printed circuit board.

17. The wireless communication apparatus of claim 15, wherein the receiving block is mounted beside an edge of the printed circuit board.

18. The wireless communication apparatus of claim 15, wherein the tunnel is a through hole in the block.

19. The wireless communication apparatus of claim 15, wherein the tunnel is a blind hole in the block.

20. The wireless communication apparatus of claim 15, wherein the tunnel has a cross section of a circle.

* * * * *